United States Patent
Uber et al.

(10) Patent No.: US 6,630,633 B1
(45) Date of Patent: Oct. 7, 2003

(54) HIGH SPEED PNEUMATIC WEIGHING DEVICE

(75) Inventors: John E. Uber, Ithaca, NY (US); Peter R. Braun, Ithaca, NY (US); Eric A. Inglin, Ithaca, NY (US)

(73) Assignee: Hi-Speed Checkweigher Co., Inc., Ithaca, NY (US)

( * ) Notice: Subject to any disclaimer, the term of this patent is extended or adjusted under 35 U.S.C. 154(b) by 0 days.

(21) Appl. No.: 09/830,142

(22) PCT Filed: Oct. 25, 1999

(86) PCT No.: PCT/US99/24843

§ 371 (c)(1),
(2), (4) Date: Jul. 13, 2001

(87) PCT Pub. No.: WO00/26621

PCT Pub. Date: May 11, 2000

Related U.S. Application Data

(60) Provisional application No. 60/106,222, filed on Oct. 30, 1998.

(51) Int. Cl.[7] .............................. G01G 5/00; B65H 29/62
(52) U.S. Cl. .......................... 177/145; 406/88; 209/639; 209/644; 209/133; 209/143; 209/591; 209/592; 198/380; 198/428; 198/438; 198/493; 198/811
(58) Field of Search ................................ 209/133, 138, 209/134, 136, 143, 591, 592, 596, 643, 644; 198/380, 428, 438, 493, 811; 177/119, 145; 406/88, 34

(56) References Cited

U.S. PATENT DOCUMENTS

| | | | |
|---|---|---|---|
| 3,180,475 A | 4/1965 | Del Rosso | 198/39 |
| 3,317,039 A | 5/1967 | Wadey | 209/120 |
| 3,366,236 A | 1/1968 | Breazeale | 209/111.5 |
| 3,592,334 A * | 7/1971 | Fleischaeur | 198/811 |
| 3,614,168 A * | 10/1971 | Range | 406/88 |
| 3,642,128 A | 2/1972 | Westwood et al. | 209/121 |
| 3,672,457 A | 6/1972 | Hester | 177/201 |
| 3,980,180 A | 9/1976 | Jamieson | 209/111.6 |
| 4,009,650 A | 3/1977 | Lascelles et al. | 99/490 |
| 4,146,467 A * | 3/1979 | Sauer et al. | 209/643 |
| 4,306,629 A | 12/1981 | Powell | 177/1 |
| 4,405,049 A | 9/1983 | Deitz | 209/630 |
| 4,405,126 A * | 9/1983 | Frye et al. | 198/438 |
| 4,444,531 A * | 4/1984 | Baker et al. | 406/88 |
| 4,452,255 A * | 6/1984 | Brand | 198/438 |
| 4,616,960 A * | 10/1986 | Gladish | 406/88 |
| 4,732,513 A * | 3/1988 | Lenhart | 406/88 |
| 4,828,434 A * | 5/1989 | Fairman et al. | 406/88 |
| 5,240,118 A | 8/1993 | Mayer | 209/539 |
| 5,258,579 A | 11/1993 | Wakasa | 177/25.14 |
| 5,322,152 A * | 6/1994 | Tommila et al. | 198/438 |
| 5,634,636 A | 6/1997 | Jackson et al. | 271/225 |
| 5,723,824 A | 3/1998 | Stadler | 177/145 |
| 5,819,954 A | 10/1998 | Lacriola | 209/563 |
| 6,084,184 A | 7/2000 | Troisi | 177/145 |

FOREIGN PATENT DOCUMENTS

FR    2 529 326    12/1983

* cited by examiner

Primary Examiner—Randy Gibson
(74) Attorney, Agent, or Firm—Simpson & Simpson, PLLC

(57) ABSTRACT

A pneumatic weighing device has a weigh pan, which is supported for vertical movement by a load cell in response to the weight of an article; the weigh pan is provided with a plenum chamber having an apertured upper surface through which air under pressure is directed for purpose of providing an air cushion for supporting and transporting articles to be weighed. The weighing device additionally includes pneumatic means for rejecting articles of improper weight.

14 Claims, 4 Drawing Sheets

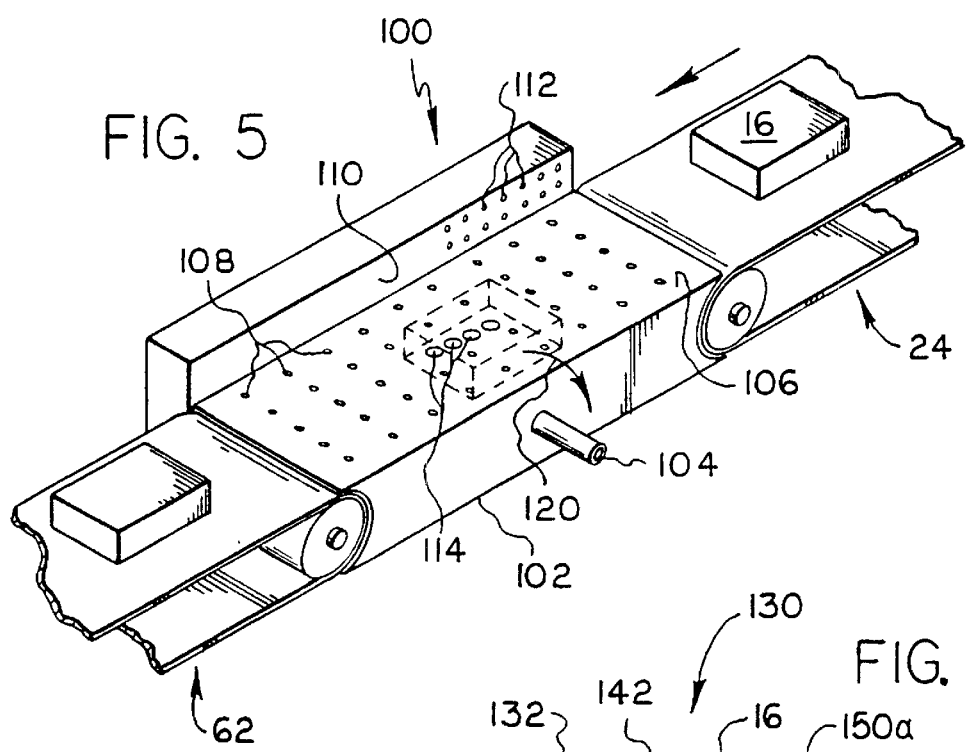
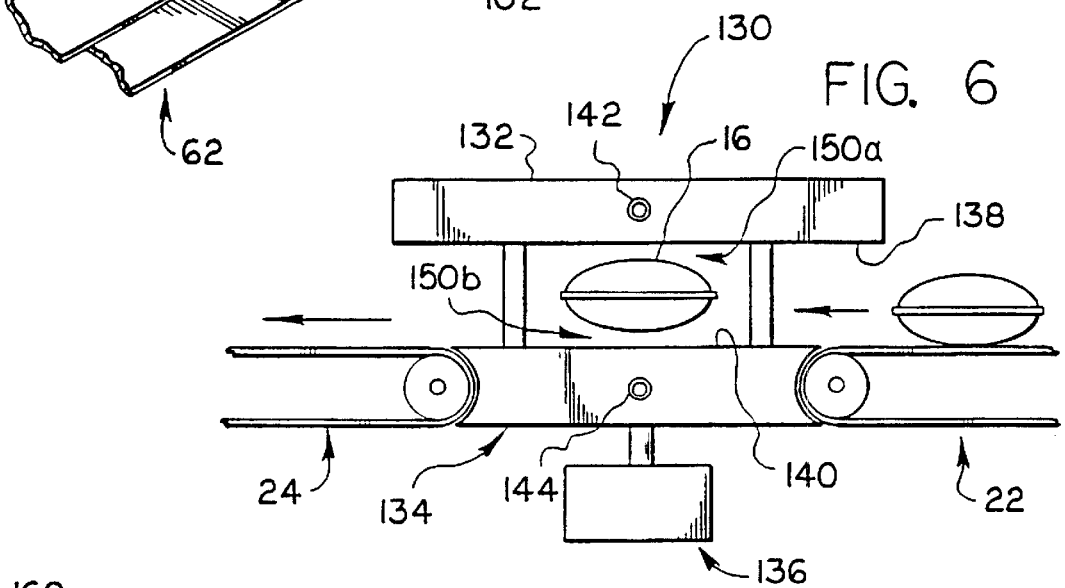
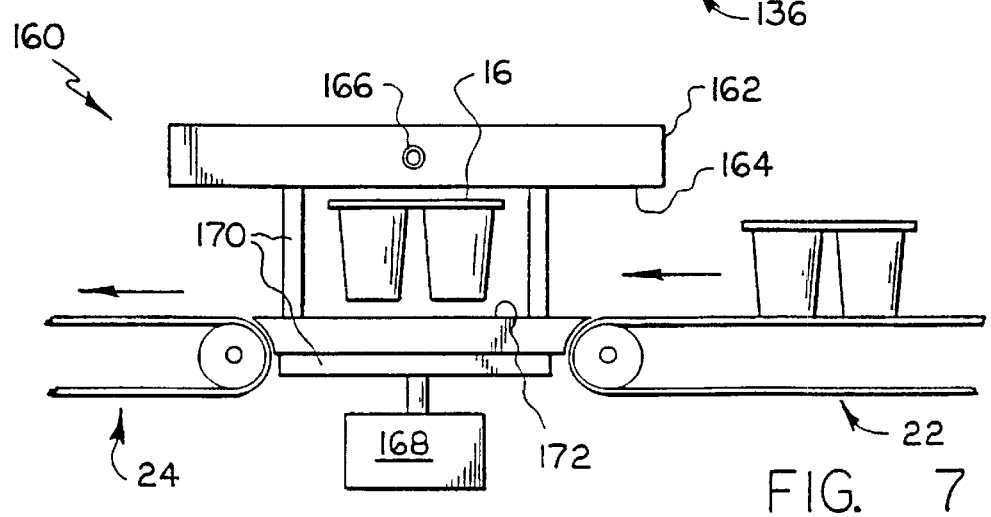

HIGH SPEED PNEUMATIC WEIGHING DEVICE

This application claims benefit of Provisional Application Ser. No. 60/106,222 filed Oct. 30, 1998.

BACKGROUND OF THE INVENTION

A pneumatic weighing device is disclosed in U.S. Pat. No. 4,306,629, wherein an air cushion is employed to support an article passing through a weighing station. Weight of an article is detected by employing a pressure transducer to measure the amount of pressure required to support the article.

SUMMARY OF THE INVENTION

The present invention is directed towards a weighing mechanism, wherein a weigh pan is provided with a plenum chamber having an apertured upper surface through which air under pressure is directed for purposes of providing an air cushion for supporting and transporting articles to be weighed. The weigh pan is supported on a conventional load cell for measuring the weight of the article supported above the weigh pan by the air cushion. Articles are transported onto and from the weigh pan by vertically stationary air cushion devices.

The weighing mechanism additionally includes pneumatic means for rejecting articles of improper weight from a stream of articles passing downstream from the weigh pan.

In an alternative embodiment, an apertured vacuum chamber is supported for vertical movement with the weigh pan and provides a zone of reduced pressure cooperating with the air cushion to support irregularly shaped articles in spaced relation to the apertured surface of the weigh pan.

In a further alternative embodiment, an apertured vacuum chamber is connected directly to a load cell in the absence of the provision of an air cushion above a weigh pan for use in weighing articles having upwardly-facing surfaces, which are relatively large compared to their downwardly-facing surfaces.

The present invention permits an increase in accuracy of the weighing operation, as compared to prior known weighing mechanisms employing belt or chain conveyors passing across a load cell mounted weigh pan, and provides for a lower cost installation. Moreover, it is contemplated that the invention will allow for substantial increases in the numbers of articles weighed per unit time and/or the speed at which articles are transported through a weighing station.

BRIEF DESCRIPTION OF THE DRAWINGS

The nature and mode of operation of the present invention will now be more fully described in the following detailed description taken with the accompanying drawings wherein

FIG. 5 is a prospective view of an alternative pneumatic rejecter;

FIG. 6 is a side elevational view of an alternative weighing station, wherein an apertured vacuum chamber is supported above and for vertical movement with a weigh pan;

FIG. 7 is a side elevational view of a further alternative weighing station, wherein an apertured vacuum chamber provides the sole support for an article during a weighing operation.

DETAILED DESCRIPTION

Figure 1:
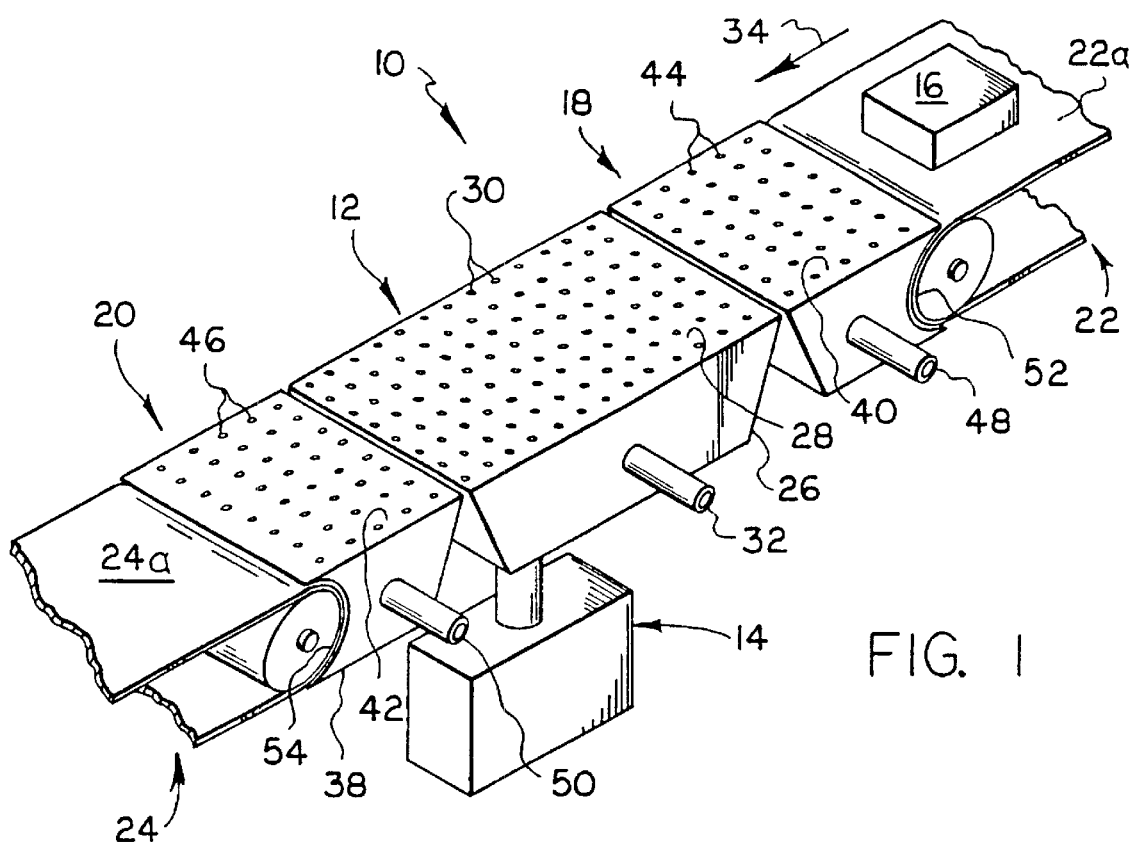
FIG. 1 is a prospective view of a weighing mechanism formed in accordance with the present invention.

Reference is first made to FIG. 1 wherein a weighing mechanism formed in accordance with the present invention includes a weighing station generally designated as 10. Weighing station 10 includes a weigh pan 12, which is supported for vertical movement by a conventional load cell 14 in response to the weight of an article 16, such as a 16, placed thereon, and arranged in alignment with vertically stationary, infeed and outfeed air cushion transport devices, 18 and 20, which bridge between the weigh pan and infeed and outfeed or discharge conveyors, such as conventional belt conveyors 22 and 24.

Weigh pan 12 is shown as including a plenum chamber 26 having a generally planer upper surface 28 formed with a plurality of apertures 30 through which air under pressure supplied to chamber 26 through supply conduct 32 is exhausted to atmosphere in order to create an air cushion for supporting article 16 in a non-contacting relation with surface 28, during transport thereof across the surface between transport devices 18 and 20 in the direction indicated by arrow 34. Transport devices 18 and 20 include vertically stationary plenum chambers 36 and 38 having generally planer upper surfaces 40 and 42 formed with apertures 44 and 46. Chambers 36 and 38 are supplied with air under pressure via supply conduits 48 and 50, and preferably have their infeed and outfeed or discharge ends 52 and 54 formed of concave configuration in order to provide for minimum separation between the infeed and outfeed or discharge ends of surface 28 and surfaces 22a and 24a of belt conveyors 22 and 24.

The size of surface 28; the number, arrangement and sizes of apertures 30; and the pressure and flow rate of air supplied to chamber 26, will be varied depending upon the size, weight and configuration of the articles to be weighed. Typically, however, apertures 30 will be of small diameter, closely-spaced and arranged in a relatively uniform pattern of columns and rows at least in the central portion of surface 28 across which articles are intended to pass. Further apertures 30 may exhaust jets of air arranged normal to surface 28 or be inclined at a desired angle relative thereto in the direction of arrow 34 in order to assist in transporting articles between infeed and discharge ends 28a and 28b of surface 28. Also, if desired, apertures 30 arranged in the outermost columns of apertures and extending parallel to the direction of arrow 34, may be shaped and arranged to direct jets of air transversely of the direction of arrow 34 in order to direct or position articles centrally of surface 28, as same are transported between transport devices 18 and 20.

Figure 2:
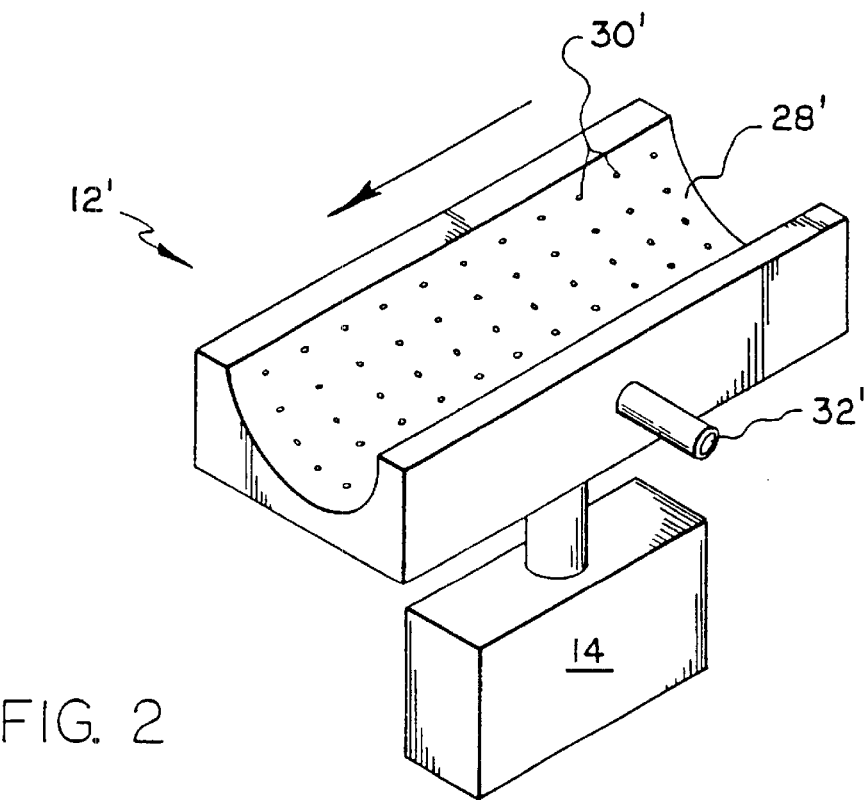
FIG. 2 is a prospective view of an alternative weigh pan configuration adapted for the weighing of elongated cylindrically shaped articles.

An alternative weigh pan 12' illustrated in FIG. 2 is intended for use in weighing elongated, generally cylindrical or spherical articles, not shown. In this construction, apertures 30' extend through a concave or trough-shaped surface 28', which is intended to conform closely to the cross-sectional configuration of the article to be weighed. Apertures 30' may be arranged in a uniform manner, or may be concentrated adjacent the bottom or upwardly facing central portion of surface 28' for purposes of supporting the weight of the article passing across the weigh pan with fewer apertures being arranged adjacent the lengthwise extending marginal edges of such surface as required to center the transported article transversely of the weigh pan. Weigh pan 12' is vertically movably supported by a load cell 14', may be placed in flow communication with a suitable source of air under pressure via a conduit 32' and may be arranged in alignment with vertically stationary pneumatic transport devices, not shown, having apertured surfaces corresponding in curvature to surface 28'.

In accordance with conventional practice, the present invention would typically include a suitable mechanism for use in separating articles of improper weight from a stream of proper weight articles passing downstream from weighing station 10 on outfeed conveyor 24. In a preferred construction shown in FIG. 3, a pneumatic rejecter 60 is arranged between a discharge end of discharge conveyor 24 and the inlet end of a further transport conveyor 62, and includes a plenum chamber 64, which is supplied with pressurized air through a supply conduit 66 and is formed with an upper support surface 68 having a concave, lengthwise-extending side edge 68a, and an opposite. convex, lengthwise extending side edge 68b. Side edges 68a and 68b extend between straight and parallel inlet and discharge edges 68c and 68d. Surface 68 has an inlet surface portion 70, which curves downwardly and transversely towards edge 68a, an outlet surface portion 72, which curves upwardly and transversely towards edge 68b, and a central or reject surface portion 74, which interconnects portions 70 and 72 and slopes downwardly from edge 68b to edge 68a. Surface portions 70, 72 and 74 are provided with relatively uniformly-spaced columns and rows of apertures 76 sufficient to provide an air cushion adapted to support articles, such as boxes 16, in a non-contacting relationship with surface 68 during passage between conveyors 24 and 62. Additionally reject surface portion 74 is provided with a rejecter nozzle in the form of a line of enlarged, closely-spaced apertures 80 or a slot, not shown, aligned with the direction of travel of the articles. Chamber 64 is additionally provided with a side wall surface 82, which is arranged to upstand from adjacent concave side edge 68a and is provided with apertures 84 arranged to provide an air cushion tending to prevent contact of transported articles therewith during transport of articles between conveyors 24 and 62. Preferably, side wall surface 82 is disposed normal to surface 68 adjacent the midpoint of surface portion 74 and apertures 84 are inclined in a direction transversely of upper surface 68 in order to propel or transport articles lengthwise of such upper surface.

Figure 3:
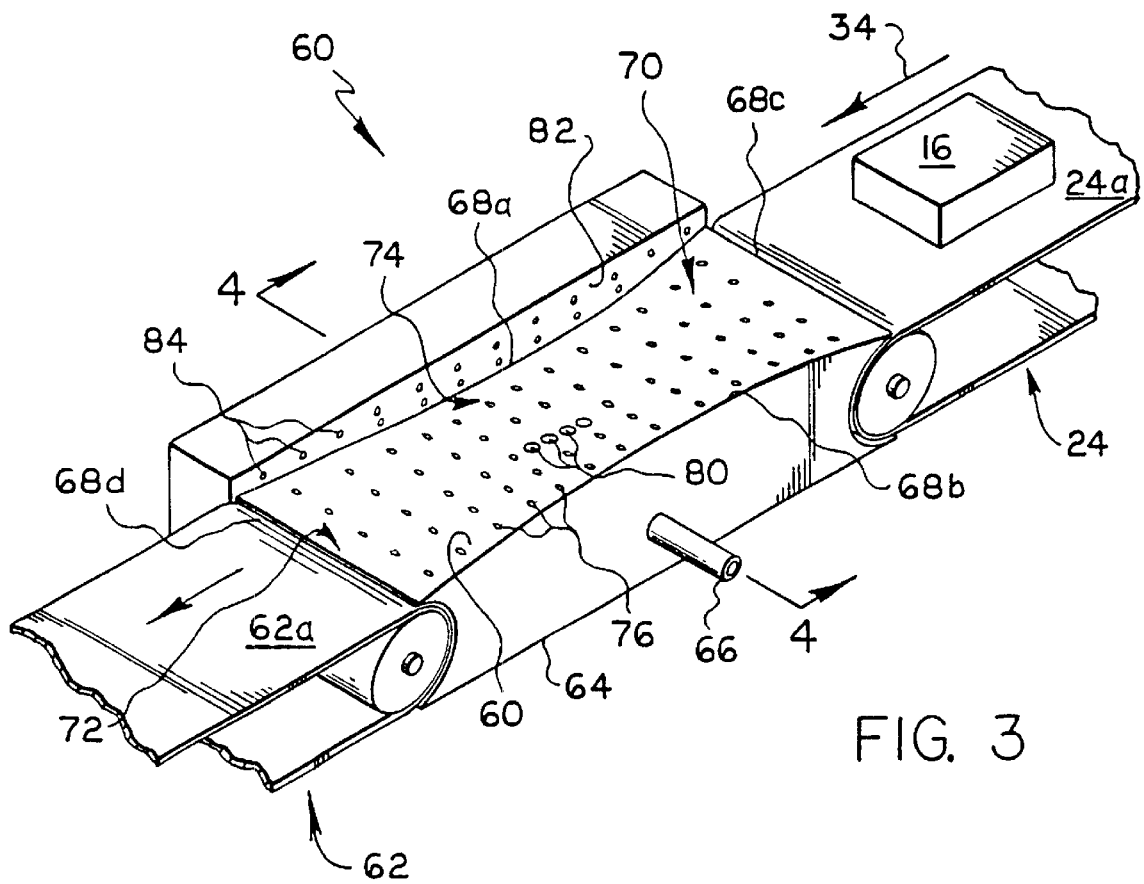
FIG. 3 is a prospective view of a pneumatic rejecter adapted for rejecting articles of improper weight.

Chamber 64 may have concave opposite ends to provide for minimum separation between its upper surface 68 and the article transport surfaces 24a and 62a of belt conveyors 24 and 62, as shown in FIG. 3.

Figure 4:
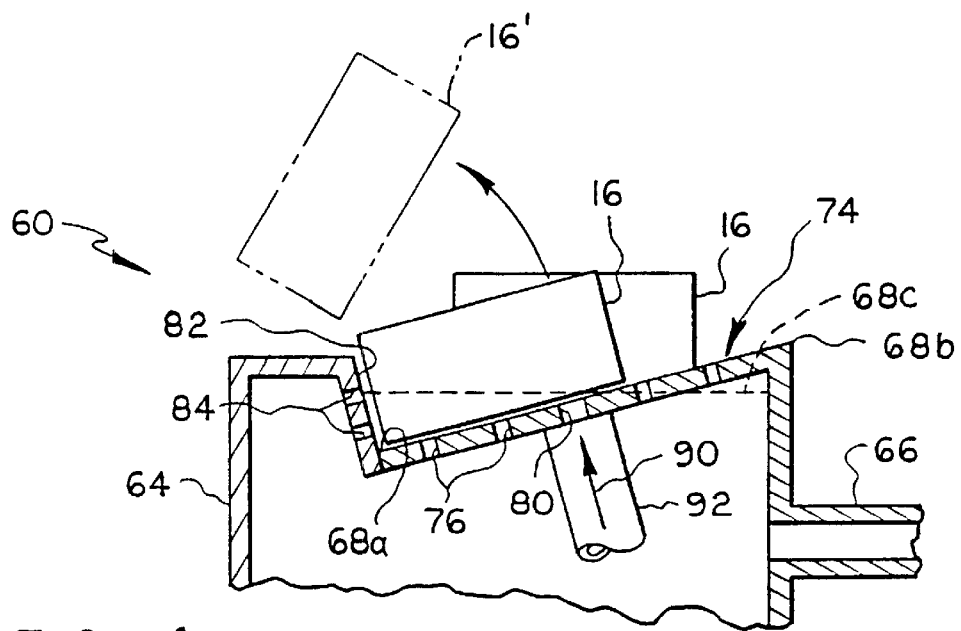
FIG. 4 is a fragmentary sectional view taken generally along the line 4—4 in FIG. 3.

In operation, a first discharge stream of articles transported by belt conveyor 24 downstream of weighing station 10 would normally be centered transversely of the conveyor, as indicated in FIGS. 3 and 4. As articles are conveyed onto inlet surface portion 70, the force of gravity and air jets directed normal to such surface portion tend to move the articles transversely into a second discharge stream of articles, shown only in FIG. 4, as being displaced transversely relative to the first discharge stream and disposed in a closely-spaced relationship to side wall surface 82 by the time the articles begin to transverse reject surface portion 74. A conventional memory or timing circuit, not shown, is employed to indicate when an article of improper weight is disposed in vertical alignment with nozzle apertures 80, whereupon a blast of air is directed upwardly, as indicated by arrow 90 for purposes of rejecting such article of improper weight upwardly over side wall surface 82, as indicated at 16' in FIG. 4. Articles of proper weight are not rejected and pass onto further transport belt conveyor 62 in a third discharge stream not shown, aligned with the above-mentioned second discharge stream. The blast of air issuing from reject nozzle apertures 80 may be supplied by a separate valve controlled conduit designated generally at 92, which communicates with a suitable source of pressurized air.

A second pneumatic rejecter shown in FIG. 5 at 100 includes a plenum chamber 102 supplied with pressurized air via a conduit 104. Chamber 102 has a generally planar upper surface 106 provided with columns and rows of apertures 108 adapted to provide an air cushion for supporting articles in a non-contacting relation with surface 106 during passage thereacross between conveyor 24 and a further transport belt conveyor 62, and a vertically upstanding side wall surface 110 provided with apertures 112. Additionally, surface 106 is provided with a rejecter nozzle defined for example by a plurality of enlarged, closely-spaced apertures 114 or a slot, not shown, aligned in the direction of travel of articles 16. Apertures 112 are located only adjacent the inlet end of surface 106, as shown in FIG. 5.

In operation, a first discharge line of articles conveyed by conveyor 24 is transported lengthwise of surface 106 by the air cushion created by apertures 108 for discharge onto conveyor 62. When articles of the first discharge line are of proper weight, articles transported lengthwise of surface 106 and by conveyor 62 are aligned with such first discharge line. However whenever an article in the first discharge line is determined to be of an improper weight, a suitable memory, or timing circuit, not shown, serves to first cause a blast of air to be directed through apertures 112 to displace such article of improper weight transversely of its direction of travel into a displaced position arranged in overlying relation with nozzles 114, as indicated in broken line in FIG. 5, and then to direct a blast of air upwardly through apertures 114 to flip such article off of surface 106, as indicated by arrow 120. Pressurized air may be supplied to apertures 112 and 114 by suitable valve-controlled conduits, not shown.

FIG. 6 illustrates an alternative weighing station 130, wherein a vacuum chamber 132 is supported above and for vertical movement with a pneumatic weigh pan 134 by a load cell 136 in response to the weight of an article 16 passing between conveyors 22 and 24. Facing surfaces 138 and 140 of chamber 132 and weigh pan 134 would preferably be essentially parallel and provided with apertures, not shown, connected to suitable sources of vacuum and air pressure by suitable conduits 142 and 144 for purposes of establishing zones of reduced air pressure 150a and increased air pressure or an air cushion 150b above and below an article being weighed. Preferably, aperture surface 138 is arranged to extend beyond the inlet and outlet ends of weigh pan 134 in order to assist in the transfer of articles onto and from the weigh pan relative to conveyors 22 and 24

A weighing station of the construction shown in FIG. 6 is particularly, adapted for weighing irregularly-shaped articles or those having at least curved lower surfaces, which are difficult to properly support by a single air cushion.

FIG. 7 illustrates a further alternative weighing station 160, wherein a vacuum chamber 162 has an apertured surface 164 placed in flow communication with a suitable vacuum source, not shown, by a conduit 166, and is supported for vertical movement by a load cell 168 via a connector 170 independently of a vertically-aligned and facing, stationary flat surface 172. If desired surface 172 may be dispensed with, and a single pair of a parallel chain conveyors may be employed in place of conveyors 22 and 24 to transport articles into and from weighing station 160. As with the case of weighing station 130, aperture surface 164 would serve to create a zone of reduced pressure above an article passed therebelow for purposes of lifting an article to be weighed from engagement with stationary surface 172 or a conveyor passing through the weighing station. Also, apertured surface 164 would preferably be sized and arranged to extend in an overlying relative to the discharge end of conveyor 22 and the inlet end of conveyor 24.

A weighing station of the construction in FIG. 7 is particularly adapted for weighing irregularly-shaped articles of the type having upwardly-facing surfaces, which are substantially larger than their downwardly-facing surfaces, as for the case of a double package 16 connected by a common cover or closure shown in this figure.

Figure 8:
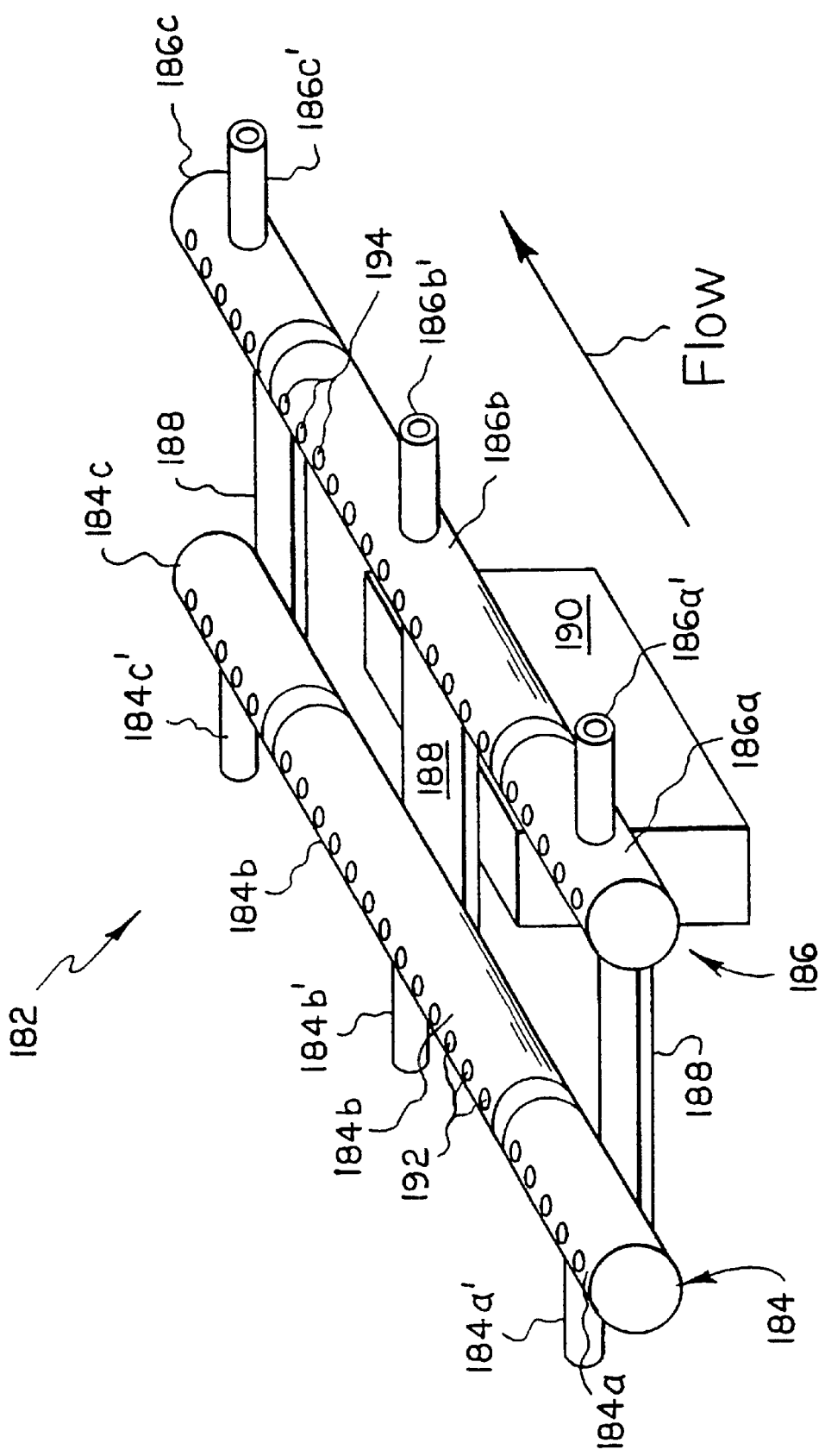
FIG. 8 is a prospective view of a further alternative weighing station.

FIG. 8 shows a further alternative construction for a weighing station particularly adapted for use in weighing non-planar surfaces of packages, such as letters, which tend to be slightly curved on their bottoms in either a concave or concave fashion when presented to the weighing station. In this construction, the weigh pan is generally designated as 182 and shown as comprising a pair of parallel, elongated tubular members 184 and 186, which extend lengthwise of weigh pan 182 in the direction indicated by arrow 182$a$ are transversely interconnected by support members 188,188 and 188 at least one of which is connected to a load cell 110. Tubular members 184 and 186 are preferably divided into a plurality of units 184$a$–184$c$ and 186$a$–186$c$ individually supplied with an under pressure by supply conduits 184$a'$–184$c'$ and 186$a'$–186$c'$. Each unit is provided with a plurality of air discharge apertures 192 and 194, arranged to form two rows of apertures. The apertures may be positioned to direct their exhaust jets normal to a plane arranged to extend tangent to the upper surfaces of members 184 and 186, or at a slight inclination relative thereto in order to propel a package lengthwise of weigh pan 182. It is anticipated that tubular members may be of unitary construction when desiring to weigh packages which are relatively small in the direction of movement lengthwise of weigh pan 182.

What is claimed is:
1. A weighing mechanism comprising in combination:
a weighing station having a first surface supported for vertical movement by a load cell and having a plurality of apertures, said surface being arranged to face vertically towards an article to be weighed while passing through said weighing station, and means for passing air under pressure through said apertures in a direction relatively towards said article or for drawing air through said apertures in a direction relatively away from said article for supporting said article while passing through said weighing station; and
first means for placing an article in said weighing station in vertical alignment with said surface.
2. A mechanism according to claim 1, wherein said first surface is arranged to be positioned vertically below said article and said means passes air under pressure through said apertures towards said article.
3. A mechanism according to claim 1, wherein said first surface is arranged to be positioned vertically above said article and said means draws air through said apertures away from said article.
4. A mechanism according to claim 2, wherein there is further provided a second surface supported for vertical movement with said first surface by said load cell, said second surface being arranged to face vertically downwardly towards said first surface and said means further draws air through said apertures of said second surface away from said article.
5. A mechanism according to claim 1, wherein said first means includes an infeed conveyor for transporting articles one at a time towards said weighing station; and air cushion transport device arranged intermediate said conveyor and said first surface for transporting articles therebetween, said transport device having a vertically stationary upwardly facing surface having a plurality of apertures and further means for passing air through said apertures of said vertically stationary surface for supporting said article to be weighed passing between said infeed conveyor and said weighing station.
6. A mechanism according to claim 5, wherein there is additionally provided an outfeed conveyor for transporting weighed articles away from said weighing station and a second air cushion transport device arranged intermediate said weighing station and said outfeed conveyor for supporting weighed articles passing between said weighing station and said outfeed conveyor.
7. A mechanism according to claim 1, wherein said surface is planar.
8. A mechanism according to claim 1, wherein said surface is concave.
9. A mechanism according to claim 1, wherein said surface is shaped to conform to a cross-sectional configuration of said article.
10. A mechanism according to claim 1, wherein there is further provided in combination a separating mechanism for separating weighed articles of improper weight from weighed articles of proper weight while passing downstream from said weighing station, said separating mechanism comprising a further upwardly facing support surface bounded by a concave lengthwise extending first side edge, an opposite, convex, lengthwise extending second side edge, and straight and parallel inlet and discharge edges extending transversely between upstream and downstream ends of said first and second side edges, said further support surface having apertures for directing air under pressure upwardly towards said articles for supporting weighed articles passing across said further support surface; a side wall surface upstanding from said first side edge and having apertures for directing air transversely of said further support surface tending to prevent frictional engagement of weighed articles with said side wall surface; and at least one air ejector aperture opening upwardly through said further support surface for selectively directing a blast of air upwardly against weighed articles of improper weight for rejecting same upwardly over said sidewall surface.
11. A mechanism according to claim 1, wherein there is further provided in combination a separating mechanism for separating weighed articles of improper weight, while passing downstream from said weighing station along a first path of travel, said separating mechanism comprising a further upwardly facing support surface having a lengthwise extending first and second side edges, a side wall surface upstanding from adjacent said first side edge, said further support surface having apertures for passing air under pressure upwardly for supporting weighed articles passing lengthwise of said further support surface, said side wall surface having apertures for directing air transversely of said further support surface tending to move said weighed articles of improper weight transversely of said first path of travel into a second path of travel, and at least one air ejector opening upwardly through said further support surface in alignment with said second path of travel for selectively directing a blast of air upwardly against said weighed articles of improper weight for rejecting same upwardly over said second side edge.

12. A mechanism according to claim 1, wherein said first surface is defined by a pair of parallel, upwardly facing surfaces elongated in the direction of movement of said articles to be weighed through said weighing station, each of said pair of surfaces having apertures communicating with a plurality of separate plenum chambers individually connected to a source of air under pressure and collectively supported by said load cell.

13. A pneumatic separating mechanism for separating weighed articles of improper weight from articles of proper weight while passing downstream from an article weighing station, said separating mechanism comprising an upwardly facing support surface bounded by a concave lengthwise extending first side edge, an opposite, convex, lengthwise extending second side edge, and straight and parallel inlet and discharge edges extending transversely between upstream and downstream ends of said first and second side edges, said support surface having apertures for directing air under pressure upwardly towards said articles for supporting weighed articles passing across said support surface, a side wall surface upstanding from said first side edge and having apertures for directing air transversely of said support surface tending to prevent frictional engagement of weighed articles with said side wall surface; and at least one air ejector aperture opening upwardly through said support surface for selectively directing a blast of air upwardly against weighed articles of improper weight for rejecting same upwardly over said sidewall surface.

14. A pneumatic separating mechanism for separating weighed articles of improper weight from articles of proper weight while passing downstream from an article weighing station along a first path of travel, said separating mechanism comprising an upwardly facing support surface having a lengthwise extending first and second side edges and a side wall surface upstanding from adjacent said first side edge, said support surface having apertures for directing air under pressure upwardly towards weighed articles passing lengthwise of said support surface, said side wall surface having apertures for directing air transversely of said support surface tending to move said weighed articles of improper weight transversely of said first path of travel into a second path of travel, and at least one air ejector opening upwardly through said support surface in alignment with said second path of travel for selectively directing a blast of air upwardly against said weighed articles of improper weight for rejecting same upwardly over said second side edge.

* * * * *